United States Patent
Chen et al.

(10) Patent No.: US 10,904,642 B2
(45) Date of Patent: Jan. 26, 2021

(54) METHODS AND APPARATUS FOR UPDATING MEDIA PRESENTATION DATA

(71) Applicant: MEDIATEK Singapore Pte. Ltd., Singapore (SG)

(72) Inventors: Lulin Chen, San Jose, CA (US); Xin Wang, San Jose, CA (US)

(73) Assignee: MEDIATEK Singapore Pte. Ltd., Singapore (SG)

( * ) Notice: Subject to any disclaimer, the term of this patent is extended or adjusted under 35 U.S.C. 154(b) by 0 days.

(21) Appl. No.: 16/410,756

(22) Filed: May 13, 2019

(65) Prior Publication Data

US 2019/0394537 A1 Dec. 26, 2019

Related U.S. Application Data

(60) Provisional application No. 62/695,287, filed on Jul. 9, 2018, provisional application No. 62/692,946, filed (Continued)

(51) Int. Cl.
*H04N 21/84* (2011.01)
*H04N 21/235* (2011.01)
(Continued)

(52) U.S. Cl.
CPC ......... *H04N 21/84* (2013.01); *H04N 21/2343* (2013.01); *H04N 21/2353* (2013.01); *H04N 21/435* (2013.01); *H04N 21/8586* (2013.01)

(58) Field of Classification Search
CPC .............. H04N 21/23439; H04N 21/84; H04N 21/8586; H04N 21/2353
See application file for complete search history.

(56) References Cited

U.S. PATENT DOCUMENTS 8,924,582 B2 12/2014 Giladi
2011/0307581 A1* 12/2011 Furbeck .................. H04L 67/34
709/219

(Continued)

FOREIGN PATENT DOCUMENTS

| CA | 2774923 C | 3/2011 |
| KR | 101447389 B1 | 10/2014 |
| WO | WO 2013/077960 A1 | 5/2013 |

OTHER PUBLICATIONS

Urpalainen, An Extensible Markup Language (XML) Patch Operations Framework Utilizing XML Patch Language (XPath) Selectors. IETF Trust, RFC 5261. Sep. 2008:p. 1-40.

(Continued)

*Primary Examiner* — Robert J Hance
(74) *Attorney, Agent, or Firm* — Wolf, Greenfield & Sacks, P.C.

(57) ABSTRACT

The techniques described herein relate to methods, apparatus, and computer readable media configured to adaptively process video data. Media presentation data is associated with video data encoded in a plurality of formats, each format associated with a different bit rate. The media presentation data is generated to include first data indicative of whether the media presentation data is for static video data or dynamic video data, and second data indicative of at least one location reference to a location of a content update to the video data. A client determines, from the media presentation data, the first data and the second data, and downloads a media segment of the video data based on the first data and the second data.

20 Claims, 9 Drawing Sheets

```
<?xml version="1.0" encoding="UTF-8"?>                                    400
<MPD xmlns:xsi="http://www.w3.org/2001/XMLSchema-instance"
    xsi:schemaLocation="urn:mpeg:DASH:schema:MPD:2011 DASH-MPD.xsd"
    xmlns="urn:mpeg:DASH:schema:MPD:2011"
402  id="ActionMovie"
    type="static"
    mediaPresentationDuration="PT6158S"
    minBufferTime="PT1.4S"
    profiles="urn:mpeg:dash:profile:mp2t-simple:2011"
404  maxSegmentDuration="PT4S">
406   <EssentialProperty schemeIdUri="urn:mpeg:dash:mpd-update-property:2018"
       value="30,1,5"/>
408   <UpdateProperty type="patch">
    Location="http://localhost:1935/vod/myStream/manifest_1.mpd,http://localhost:1935/vod/
    myStream/manifest_2.mpd,http://localhost:1935/vod/myStream/manifest_ad1.mpd,http://loc
    alhost:1935/vod/myStream/manifest_3.mpd;"
    </UpdateProperty>                                410
    <Period id="Movie_01" duration="PT1800S">
    ...
    </Period>
</MPD>
```

Related U.S. Application Data on Jul. 2, 2018, provisional application No. 62/687,859, filed on Jun. 21, 2018.

(51) Int. Cl.
  *H04N 21/435* (2011.01)
  *H04N 21/2343* (2011.01)
  *H04N 21/858* (2011.01)

(56) References Cited

U.S. PATENT DOCUMENTS

| | | | | |
|---|---|---|---|---|
| 2013/0111028 A1* | 5/2013 | Kondrad | ................ | H04L 65/80 709/225 |
| 2013/0212231 A1* | 8/2013 | Shi | ................... | H04N 21/44222 709/219 |
| 2014/0150044 A1* | 5/2014 | Takahashi | .......... | H04N 21/2393 725/116 |
| 2015/0019629 A1* | 1/2015 | Giladi | .............. | H04N 21/26258 709/203 |
| 2015/0026358 A1 | 1/2015 | Zhang et al. | | |
| 2015/0382034 A1* | 12/2015 | Thangaraj | ............ | H04N 21/812 709/231 |
| 2016/0366488 A1* | 12/2016 | Long | .................. | H04N 21/2187 |
| 2018/0367637 A1* | 12/2018 | Balazinski | ....... | H04N 21/64322 |

OTHER PUBLICATIONS

International Search Report and Written Opinion for International Application No. PCT/US2019/033049 dated Aug. 12, 2019.
PCT/US2019/033049, May 20, 2019, Chen et al.
PCT/US2019/033049, Aug. 12, 2019, International Search Report and Written Opinion.
No Author Listed, Information technology—Dynamic adaptive streaming over HTTP (DASH)—Part 1: Media presentation description and segment formats, International Standard ISO/IEC 23009-1:2014(E), Draft third edidtion, Jan. 9, 2017, 218 pages.

* cited by examiner

| Element or Attribute Name | Use | Description |
|---|---|---|
| UpdateProperty 202 | | specifies an additional MPD property that may be used optionally by services to offer the specified MPD file organization, update mechanisms and locations. |
| @type 204 | OD default: 'patch' | specifies the type of organization and update for the Media Presentation available at the location. For patch Media Presentations, @type="patch"; For full Media Presentations, @type="full". Other types are reserved. |
| Location 206 | 0...N | specifies a location at which the MPD (with @type) is available.<br><br>For @type="patch", 1) when MPD@type="static", the Media Presentations available at location, separated by ','and ended with ';' are organized as the ordered multiple patches to the Media Presentations. In that order the assembled Media Presentations shall form a full Media Presentations for the content; 2) when MPD@type="dynamic", the Media Presentations available at location, followed by ';' or ended by ';' is a patch as the update to the Media Presentations for a live service.<br><br>There may be a white space, between two of ',' or between ',' and ';', to indicate an editing or Ad insertion opportunity for specifying a corresponding MPD location. In this case each of MPD-internal identifiers (MPD@id) shall be provided.<br><br>For @type="full", it may be used to provide extra location for the available Media Presentations for both static and dynamic Media Presentations, same as MPD.Location. |

FIG. 2

```
<?xml version="1.0" encoding="UTF-8"?>
<MPD xmlns:xsi="http://www.w3.org/2001/XMLSchema-instance"
  xsi:schemaLocation="urn:mpeg:DASH:schema:MPD:2011 DASH-MPD.xsd"
  xmlns="urn:mpeg:DASH:schema:MPD:2011"
  id="ActionMovie"
  type="static"
  mediaPresentationDuration="PT6158S"
  minBufferTime="PT1.4S"
  profiles="urn:mpeg:dash:profile:mp2t-simple:2011"
  maxSegmentDuration="PT4S">
  <EssentialProperty schemeIdUri="urn:mpeg:dash:mpd-update-property:2018"
  value="30,1,5"/>
  <UpdateProperty type="patch"
  Location="http://localhost:1935/vod/myStream/manifest_1.mpd,http://localhost:1935/vod/myStream/manifest_2.mpd,http://localhost:1935/vod/myStream/manifest_ad1.mpd,http://localhost:1935/vod/myStream/manifest_3.mpd;"
  </UpdateProperty>
  <Period id="Movie_01" duration="PT1800S">
  ...
  </Period>
</MPD>
```

```xml
<?xml version="1.0" encoding="UTF-8"?>
<MPD xmlns:xsi="http://www.w3.org/2001/XMLSchema-instance"
xsi:schemaLocation="urn:mpeg:DASH:schema:MPD:2011 DASH-MPD.xsd"
xmlns="urn:mpeg:DASH:schema:MPD:2011"
id="soccer2018"
type="dynamic"
minimumUpdatePeriod="PT2S"
timeShiftBufferDepth="PT30M"
availabilityStartTime="2018-06-25T12:30:30"
minBufferTime="PT4S"
profiles="urn:mpeg:dash:profile:isoff-live:2011">
<EssentialProperty schemeIdUri="urn:mpeg:dash:mpd-update-property:2018"
value="60,1,0"/>
<UpdateProperty type="patch"
Location="http://soccerhost:1024/live2018/Stream/soccer.mpd; ;">
</UpdateProperty>
<BaseURL>http://cdn1.example.com/</BaseURL>
<BaseURL>http://cdn2.example.com/</BaseURL>
<Period id="clip_01" duration="PT1800S">
  ...
</Period>
</MPD>
```

502 → type="dynamic"
504 → EssentialProperty
506 → value="60,1,0"
508 → UpdateProperty
510 → (patch)
512 → soccer.mpd

FIG. 5

```
<!-- MPD organization descriptor -->
<?xml version="1.0" encoding="UTF-8"?>
<xs:schema xmlns:xs="http://www.w3.org/2001/XMLSchema"
    targetNamespace="urn:mpeg:dash:mpd-org:2018"
    elementFormDefault="qualified">
    <xs:attribute name="Type" type="MPDpatchtype" />
    <xs:element name="Location" type="xs:anyURI,...xs:anyURI;"
        minOccurs="0" maxOccurs="N"/>
    <xs:attribute name="time_of_space" type="xs:unsignedInt"
        use="optional"/>
    <xs:attribute name="early_termination_enable" type="xs:unsignedInt"/>
    <xs:attribute name="time_to_termination" type="xs:unsignedInt"/>
    <!-- MPD patch Type enumeration -->
    <xs:simpleType name=" MPDpatchtype">
        <xs:restriction base="xs:string">
            <xs:enumeration value="patch"/>
            <xs:enumeration value="full"/>
        </xs:restriction>
    </xs:simpleType>
</xs:schema>
```

FIG. 6

```
<?xml version="1.0" encoding="UTF-8"?>
<MPD xmlns:xsi="http://www.w3.org/2001/XMLSchema-instance"
  xsi:schemaLocation="urn:mpeg:DASH:schema:MPD:2011 DASH-MPD.xsd"
  xmlns="urn:mpeg:DASH:schema:MPD:2011"
  id="ActionMovie"
  type="static"
  mediaPresentationDuration="PT6158S"
  minBufferTime="PT1.4S"
  profiles="urn:mpeg:dash:profile:mp2t-simple:2011"
  maxSegmentDuration="PT4S">
  <EssentialProperty schemeIdUri="urn:mpeg:dash:mpd:org:2018" th="patch"
   h="http://localhost:1935/vod/myStream/manifest_1.mpd,http://localho
st:1935/vod/myStream/manifest_2.mpd,http://localhost:1935/vod/myStream/
manifest_3.mpd, time_of_space="30" battery_termination_enable="1"
time_to_termination="5"/> duration="PT1800S">
  <Period id="Movie_01"
  ...
  </Period>
</MPD>
```

FIG. 7

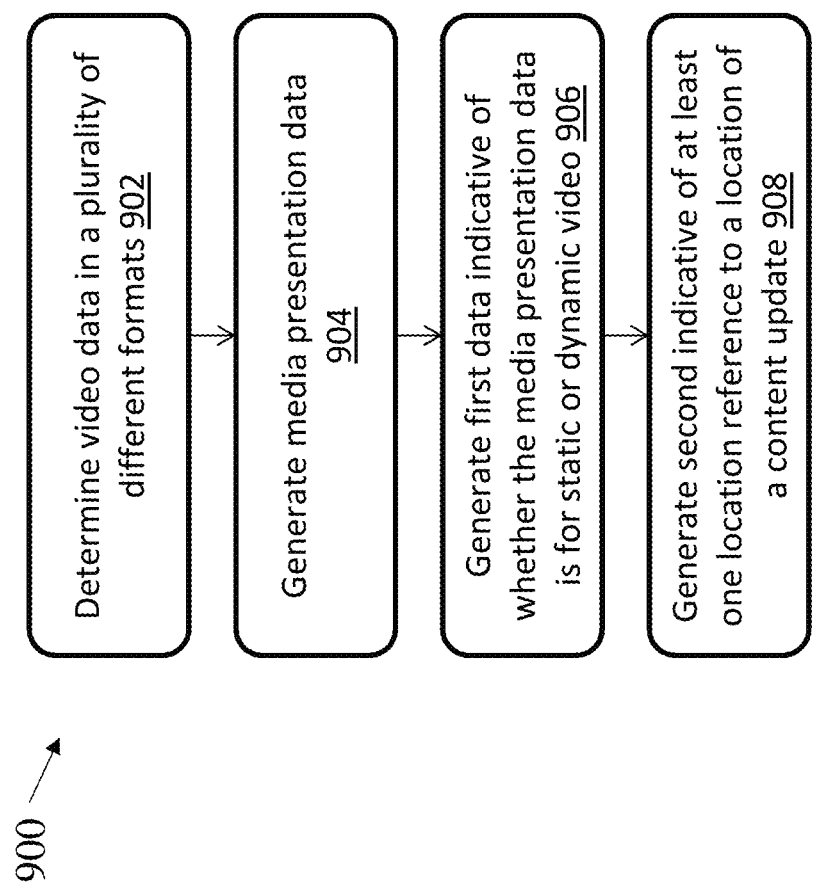

METHODS AND APPARATUS FOR UPDATING MEDIA PRESENTATION DATA

RELATED APPLICATIONS

This application claims priority under 35 U.S.C. § 119(e) to U.S. Provisional Application Ser. No. 62/687,859, filed Jun. 21, 2018, entitled "METHOD OF SPECIFYING MPD UPDATE PROPERTY FOR DASH," U.S. Provisional Application Ser. No. 62/692,946, filed Jul. 2, 2018, entitled "METHOD OF SIGNALLING MPD PATCH UPDATE FOR DASH," and U.S. Provisional Application Ser. No. 62/695,287, filed Jul. 9, 2019, and entitled "METHOD OF SPECIFYING A MPD ORGANIZATION DESCRIPTOR FOR DASH," each of which are herein incorporated by reference in their entirety.

TECHNICAL FIELD

The techniques described herein relate generally to media presentation data, and in particular relate to techniques for updating media presentation data.

BACKGROUND OF INVENTION

Various types of multimedia content, such as video content, television content, and audio content, are delivered to end users through the Internet. Web servers often stream such media content, including live or on-demand content, to end users, using the HyperText Transfer Protocol (HTTP). The end user devices that consume the media content can range from various computing devices (e.g., desktops, laptops, tablets, and/or other types of computing devices), Internet-connected televisions, television set-top boxes, smartphones, and/or the like.

The end user devices are in communication with the media servers through many different types of devices and networks. The physical components of the devices and networks (e.g., routers, cabling, etc.) can range widely. Additionally, the network conditions are often constantly changing, depending on the time of day, number of devices using network resources, device failures, routing protocols, and/or the like. Therefore, the network conditions are often unpredictable, and can change during a multimedia streaming session. The Moving Picture Experts Group (MPEG) Dynamic Adaptive Streaming over HTTP (DASH) protocol is an adaptive bitrate streaming technique that leverages conventional HTTP web servers to deliver adaptive content over the Internet. MPEG DASH breaks the content into a sequence of small file segments, each of which includes a short period of multimedia content that is made available at a variety of different bit rates. When using MPEG DASH, a client can select which of the various bit rates to download based on the current network conditions, often being configured to select the highest bit rate that can be downloaded without affecting playback. Thus, the MPEG DASH protocol allows a client to adapt to changing network conditions.

SUMMARY OF INVENTION

In accordance with the disclosed subject matter, apparatus, systems, and methods are provided for performing media presentation data updates (e.g., Media Presentation Description (MPD) updates) for various types of content, including on-demand and live content. The techniques can include, for example, providing support for additional content references in the media presentation data, providing additional elements to specify the update, and/or providing a media presentation data organization description to specify the update.

Some embodiments relate to a method for generating media presentation data associated with video data. The method includes generating media presentation data associated with video data encoded in a plurality of formats, each format associated with a different bit rate, comprising generating, within the media presentation data, first data indicative of whether the media presentation data is for static video data or dynamic video data, and generating, within the media presentation data, second data indicative of at least one location reference to a location of a content update to the video data.

In some examples, the media presentation data comprises a media presentation description (MPD) file, and the MPD file comprises the first data and the second data.

In some examples, the media presentation data is a partial change to previous media presentation data, and generating the second data includes generating an essential property element or a supplemental property element of the media presentation data comprising the second data, and generating the second data comprises generating a set of location references, wherein each location reference from the set of location references is to an associated location with an associated content update.

In some examples, generating the set of location references includes generating a list of uniform resource locators separated by white spaces.

In some examples, generating the second data includes generating an update property element of the media presentation data, the update property element including the second data, wherein generating the second data comprises generating a set of location references, wherein each location reference from the set of location references is to an associated location with an associated content update, and third data indicative of whether the set of location references is associated with either (a) a partial change to previous media presentation data, or (b) full media presentation data.

In some examples, generating the set of location references comprises generating a list of uniform resource locators separated by commas and terminated by a semicolon.

In some examples, generating the list of uniform resource locators comprises including a white space indicative of an editing opportunity.

In some examples, generating the second data comprises generating an organization descriptor using a supplemental property element or essential property element of the media presentation data, the organization descriptor including the second data, wherein generating the second data comprises generating a set of location references, wherein each location reference from the set of location references is to an associated location with an associated content update, and third data indicative of whether the set of location references is associated with either (a) a partial change to previous media presentation data, or (b) full media presentation data.

In some examples, generating the organization descriptor includes generating third data of the organization descriptor, wherein the third data comprises data indicative of one or more of a time of an editing opportunity, whether early termination of content for the editing opportunity is supported, and a play time of the content required before being early terminated.

Some embodiments relate to an apparatus configured to generate media presentation data associated with video data, the apparatus comprising a processor in communication with memory. The processor is configured to execute instructions stored in the memory that cause the processor to generate media presentation data associated with video data encoded in a plurality of formats, each format associated with a different bit rate, including generating, within the media presentation data, first data indicative of whether the media presentation data is for static video data or dynamic video data, and generating, within the media presentation data, second data indicative of at least one location reference to a location of a content update to the video data.

In some examples, the media presentation data comprises a media presentation description (MPD) file, and the MPD file comprises the first data and the second data.

In some examples, the media presentation data is a partial change to previous media presentation data, and generating the second data includes generating an essential property element or a supplemental property element of the media presentation data comprising the second data, and generating the second data comprises generating a set of location references, wherein each location reference from the set of location references is to an associated location with an associated content update.

In some examples, generating the set of location references comprises generating a list of uniform resource locators separated by white spaces.

In some examples, generating the second data includes generating an update property element of the media presentation data, the update property element including the second data, wherein generating the second data comprises generating a set of location references, wherein each location reference from the set of location references is to an associated location with an associated content update, and third data indicative of whether the set of location references is associated with either (a) a partial change to previous media presentation data, or (b) full media presentation data.

In some examples, generating the set of location references includes generating a list of uniform resource locators separated by commas and terminated by a semicolon.

In some examples, generating the list of uniform resource locators comprises including a white space indicative of an editing opportunity.

In some examples, generating the second data includes generating an organization descriptor using a supplemental property element or essential property element of the media presentation data, the organization descriptor including the second data, wherein generating the second data includes generating a set of location references, wherein each location reference from the set of location references is to an associated location with an associated content update, and third data indicative of whether the set of location references is associated with either (a) a partial change to previous media presentation data, or (b) full media presentation data.

In some examples, generating the organization descriptor comprises generating third data of the organization descriptor, wherein the third data comprises data indicative of one or more of a time of an editing opportunity, whether early termination of content for the editing opportunity is supported, and a play time of the content required before being early terminated.

Some embodiments relate to a method for processing media presentation data associated with video data, the method including receiving media presentation data associated with video data encoded in a plurality of formats, each format associated with a different bit rate, determining, from the media presentation data, first data indicative of whether the media presentation data is for static video data or dynamic video data, determining, from the media presentation data, second data indicative of at least one location reference to a location of a content update to the video data, and downloading a media segment of the video data based on the first data and the second data.

Some embodiments relate to an apparatus configured to process media presentation data associated with video data, the apparatus comprising a processor in communication with memory, the processor being configured to execute instructions stored in the memory that cause the processor to receive media presentation data associated with video data encoded in a plurality of formats, each format associated with a different bit rate, determine, from the media presentation data, first data indicative of whether the media presentation data is for static video data or dynamic video data, determine, from the media presentation data, second data indicative of at least one location reference to a location of a content update to the video data, and download a media segment of the video data based on the first data and the second data.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

FIG. 2 shows an example of the semantics for an Update Property Element, according to some embodiments.

FIG. 4 shows an example of a Media Presentation Description (MPD) using the scheme shown in FIG. 3 for an on-demand service, according to some embodiments.

FIG. 5 shows an example of an MPD using the scheme in FIG. 3 for a live service, according to some embodiments.

FIG. 6 shows an exemplary XML syntax for an MPD Organizational (MPDO) descriptor, according to some embodiments.

FIG. 7 shows an example of an MPD with an MPDO descriptor for an on-demand service, according to some embodiments.

FIG. 9 shows an exemplary computerized method for generating media presentation data, such as a MPD file, according to some embodiments.

DETAILED DESCRIPTION OF INVENTION

Various techniques can be used to provide media presentation data, such as a Media Presentation Description (MPD) file. It can be desirable to update the media presentation data, such as with patch (e.g., partial) updates and/or with full updates. The inventors have found that existing techniques for updating media presentation data are inefficient and inflexible, and do not allow for certain types of updates and/or related functionality. The inventors have developed techniques for providing media presentation data updates for various types of content (e.g., live content, on demand content) using both existing and/or new structures in the media presentation data. The techniques can be used to provide both patches to existing media presentation data, as well as complete updates, as discussed further herein.

In the following description, numerous specific details are set forth regarding the systems and methods of the disclosed subject matter and the environment in which such systems and methods may operate, etc., in order to provide a thorough understanding of the disclosed subject matter. In addition, it will be understood that the examples provided below are exemplary, and that it is contemplated that there are other systems and methods that are within the scope of the disclosed subject matter.

Figure 1:
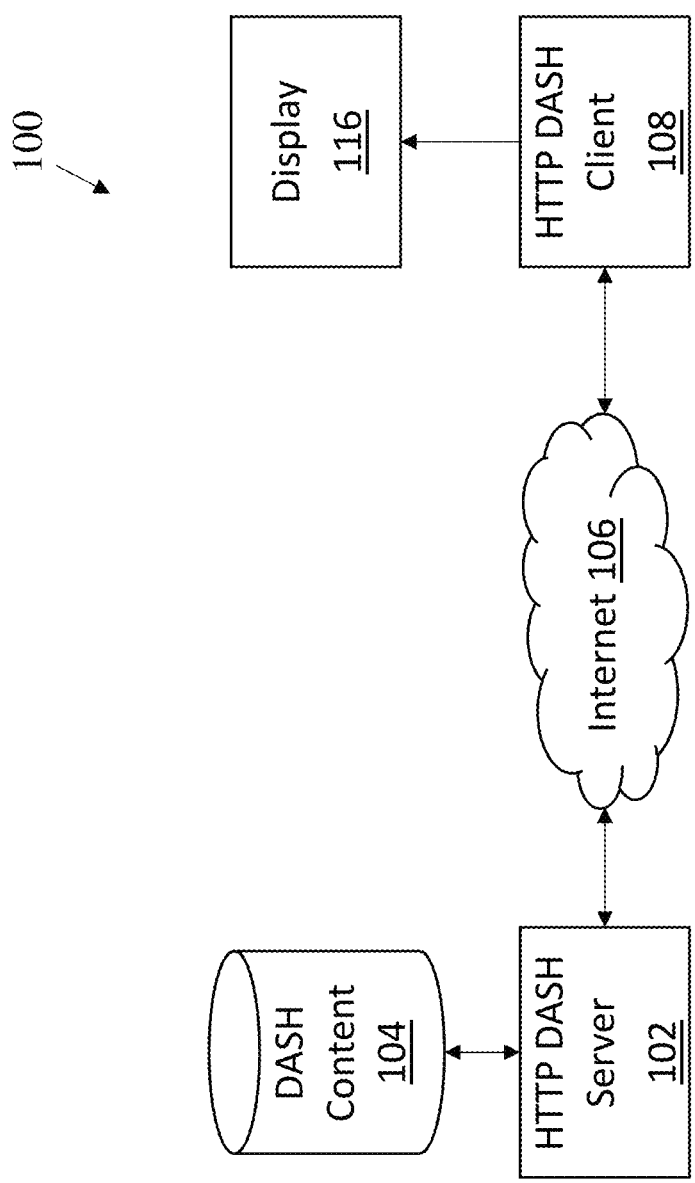
FIG. 1 shows an exemplary dynamic streaming configuration, according to some embodiments.

FIG. 1 shows an exemplary dynamic streaming configuration 100, according to some embodiments. The HTTP DASH server 102 stores and delivers dash content 104 over the Internet 106 to HTTP DASH client device 108. Only one HTTP DASH server 102 and one HTTP DASH client device 108 are shown for exemplary purposes, although it should be appreciated that numerous servers and clients can be deployed in various configurations. As explained herein, the DASH content 104 includes sequences of small file segments for each piece of multimedia content. Each file segment is a short period of the multimedia content, and is available at a variety of different bit rates. The HTTP DASH client 108 selects which of the various bit rates to download from the HTTP DASH server 102 based on the current network conditions.

For DASH applications, the content usually has a corresponding Media Presentation Description (MPD) file. The MPD provides sufficient information for the DASH client 108 to facilitate adaptive streaming of the content by downloading the media segments from the HTTP DASH server 102. The MPD is an Extensible Markup Language (XML) document that contains information about the media segments, their relationships and information necessary for the HTTP DASH client 108 to choose among the segments, and other metadata that may be needed by the HTTP DASH client 108.

The MPD can have a hierarchical structure, with the "MPD" element being the root element, which can include various parts such as basic MPD settings, Period, Adaptation Set, Representation, Segment, and/or the like. The Period can describe a part of the content with a start time and a duration. Periods can be used, for example, to represent scenes or chapters, to separate ads from program content, and/or the like. The Adaptation Set can contain a media stream or a set of media streams. In a basic example, a Period could have one Adaptation Set containing all audio and video for the content. But, more typically (e.g., to reduce bandwidth), each stream can be split into a different Adaptation Set. For example, multiple Adaptation Sets can be used to have one video Adaptation Set, and multiple audio Adaptation Sets (e.g., one for each supported language). Representations allow an Adaptation Set to contain the same content encoded in different ways. For example, it is common to provide Representations in multiple screen sizes, bandwidths, coding schemes, and/or the like. Segments are the actual media files that the DASH client plays, generally by playing them back-to-back as if they were the same file.

Media Segment locations can be described using a BaseURL for a single-segment Representation, a list of segments (SegmentList), a template (SegmentTemplate) with SegmentBase, or xlink (e.g., the xlink in the top level-element, Period). Segment start times and durations can be described with a SegmentTimeline (especially important for live streaming, so a client can quickly determine the latest segment). The BaseURL, SegmentList, and SegmentTemplate are specified in the Period. Segments can be in separate files (e.g., for live streaming), or they can be byte ranges within a single file (e.g., for static or on-demand content).

The MPD can also include one or more EssentialProperty descriptor elements and/or a SupplementalProperty descriptor elements. The EssentialProperty element can specify information about the containing element that is considered essential by the Media Presentation author for processing the containing element. The SupplementalProperty element can specify supplemental information about the containing element that may be used, for example, by the DASH client optimizing the processing.

One of such examples is the Spatial Relationship Description (SRD) scheme. The SRD scheme with EssentialProperty or SupplementalProperty descriptor allows Media Presentation Description authors to express spatial relationships between Spatial Objects. A Spatial Object is represented by either an Adaptation Set or a Sub-Representation. As an example, a spatial relationship may express that a video represents a spatial part of another full-frame video (e.g. a region of interest, or a tile). The value of the EssentialProperty or SupplementalProperty elements using the SRD scheme is a comma separated list of values for the SRD parameters. Some exemplary SRD attributes include the source_id, the object_x, the object_y, the object_width, the object_height, the total_width, the total_height, and/or the spatial_set_id. The source_id can specify an identifier for the source of the content. The object_x can specify the horizontal position of the top-left corner of the Spatial Object. The object_y can specify the vertical position of the top-left corner of the Spatial Object. The object_width can specify the width of the Spatial Object. The object_height can specify the height of the Spatial Object. The total_width can specify the width of the reference space. The total_height can specify the height of the reference space. The spatial_set_id can specify an identifier for a group of Spatial Objects. A legacy DASH client may ignore the scheme or stop if it does not understand it as supplemental information, or as essential information.

For MPEG DASH applications, a MPD may have a type of "static" or "dynamic." A static MPD does not change for the media presentation. The static MPD type is often used with on-demand streaming services, such that the static MPD is a description for the whole respective content. For static MPDs, the DASH client can perform a one-time fetch of the MPD if the client chooses to request a full length of content. Dynamic MPDs can be updated during the media presentation. The dynamic MPD type is often used for live events, such that the dynamic MPD changes during the event and therefore requires updating during the event timeline. For dynamic MPDs, a DASH client typically needs to periodically request the updated version of MPD in order to continue the event playout.

Part 1 of the DASH standard is the Dynamic Adaptive Streaming over HTTP (DASH), Part 1: Media presentation description and segment formats," ISO/IEC 23009-1, Draft 3$^{rd}$ Ed., January, 2017 ("DASH Part 1"), which is hereby incorporated by reference herein in its entirety. DASH Part 1 specifies a full version MPD update for a dynamic MPD.

See DASH Part 1, Section 5.4. MPD updates typically extend the accessible Segment list for each Representation, introduce a new Period, update Segment locations, and/or terminate the Media Presentation. Of note, the MPD update provides a full version of the updated MPD, rather than a patch (e.g., partial change) to a previous version of the MPD.

The DASH standard also specifies an event message for a patch or full version MPD update. See DASH Part 1, Section 5.10.4. The Dash event format can include an MPD patch or a complete MPD, depending on the event value. The DASH event for an MPD update has to be present periodically in Representations along with live service timelines.

The MPD file size may vary depending on the number and length of Periods, the number of Adaptation Sets in a Period, the number of Representations in each Adaptation Set, and/or the like. Generally, the more of each instance, the larger the MPD. As noted above, the segment URL used for each segment can be specified using a SegmentList, a SegmentTemplate, or xlink. However, current techniques for specifying the segment URL, such as SegmentList or xlink, may generate a larger size MPD, compared to other existing techniques, such as a SegmentTemplate. For example, compared to SegmentList and xlink, a reasonable size MPD can be maintained by expressing the segment URL using the SegmentTemplate, such as by using $Time$ or $Number$ as specified in the DASH standard. However, a SegmentTemplate is unable to provide flexibility to incorporate advanced DASH features, neither.

For both static and dynamic MPDs, it is often desirable to support Ad insertion. There are some specified or proposed solutions with current DASH technologies. For example, in current technologies under consideration for DASH, the DPD (DASH Play List) and mixed Period technologies have been discussed for ad insertion. However, both are complicated to implement, and have other technical issues. Therefore, a more flexible approach is needed in terms of both organizing MPDs, as well as to address current issues with DASH clients, including the size of the MPD, frequent in-band MPD update messages, issues with ad insertion, and/or the like.

Referring back to FIG. 1, the HTTP DASH Server 102 sends the MPD to the HTTP DASH client 108 upon request from the DASH client. Upon receiving an MPD, a DASH client can select media content segments described in the MPD. The DASH client can select the media segments with a given timeline, given IDs of Period, Adaptation Set, and Representation in terms of personal preference and network dynamics.

The inventors have discovered and appreciated that existing DASH techniques have various deficiencies. Existing techniques for MPD updates cannot be uniformly provided for both static and dynamic MPDs (e.g., for on-demand content and live content). Existing techniques for MPD updates also do not provide flexibility to provide an MPD update type regardless of the MPD type, such as to provide either MPD patches or full MPD updates. As discussed above, for example, the MPD update cannot provide an MPD patch (rather it provides a full MPD). As another example, an MPD patch can only be provided for dynamic DASH events, and the DASH event typically needs to be present periodically in Representations and with live service timelines.

The inventors have developed technical improvements, discussed further herein, to internet-based media streaming techniques. The technical improvements can, for example, provide better control of the MPD size (e.g., to meet requirements of various DASH client devices), provide support of content editing and ad insertion (e.g., for pre-roll and mi-roll applications), facilitate effective controlled playback and editing, and/or the like. In some embodiments, the techniques provide for specifying MPD update information for both static and dynamic types of MPDs. In some embodiments, the MPD update information can be provided at the MPD level (e.g., as an MPD element, within the MPD EssentialProperty or SupplementalProperty element, etc.). Some techniques provide for specifying MPD update information (e.g., update URLs, which can be specified at the MPD level). Some techniques provide for a new MPD element that can generalize the Media Presentation organization and update mechanisms for both live and on-demand services with features that can set an MPD update property type and location, as discussed further herein. Some techniques provide for specifying the MPD organization.

In some embodiments, additional information can be used to facilitate an MPD patch update for both live and on-demand content (e.g., MPDs of both static and dynamic types). The additional information can be, for example, MPD URL information. The URL(s) can be included, for example, as a parameter specified by the EssentialProperty and/or the SupplementalProperty elements of the MPD (e.g., by the @value attribute). The scheme to signal the MPD patch can be specified by a URN (e.g., "urn:mpeg:dash:mpd-patch-update:2018"). The identifier (e.g., the attribute of the descriptor, @ schemeIdUri) can indicate that the value of the EssentialProperty or SupplementalProperty contains a white-space separated list of HTTP URLs that are recommended to be used for fetching and combining MPD patches. For example, the URLs can be used, in terms of the XML Patch Operations framework specified by IETF RFC 5261, which is hereby incorporated by reference herein in its entirety, for obtaining the appropriate patches. The value of the URLs (e.g., the @value field of the EssentialProperty or SuppelmentalProperty) can contain a list (e.g., white-space separated) of HTTP URLs at which the Media Presentation patches are available, and to which the DASH client can send a request to obtain the MPD patch. Advantageously, DASH applications that use this scheme may offer additional MPD update mechanisms. For legacy DASH clients that does not understand the proposed scheme, the legacy clients may ignore the scheme (e.g., and continue to use the MPD update mechanism specified in the current standard).

In some embodiments, the MPD can include a new element to specify MPD update information. For illustrative purposes, the new MPD element will be referred to herein as the UpdateProperty element, which is for exemplary purposes only since other names can be used for the new MPD element without departing from the techniques discussed herein. The new MPD element can be included regardless of the type of MPD, including for static and dynamic MPDs. In some embodiments, UpdateProperty element is optional such that the MPD can include either zero or one UpdateProperty element. The UpdateProperty element can be used to specify an MPD update property. The UpdateProperty can be used, for example, by services to offer the specified MPD file organization, update mechanisms, and locations, as discussed further below. In some embodiments, to include an UpdateProperty element, an Essential Descriptor or Supplemental Descriptor is included on the MPD level with the @ schemeIDURl set to a Uniform Resource Name (URN) for the Update Property (e.g., "urn:mpeg:dash:mpd-update-property:2018").

The UpdateProperty element can include various attributes. FIG. 2 shows an example of the semantics 200 for the UpdateProperty Element 202, according to some embodiments. The UpdateProperty element 202 includes a type attribute @type 204 and a location element Location 206. The type attribute 204 can specify the type of organization and update for the Media Presentation that is available at the location attribute. For patch Media Presentations, the type attribute 204 can be set to a "patch" type, whereas for full Media Presentations the type attribute 204 can be set to "full." The Location element 206 can include any number of locations at which the MPD (e.g., with the type specified by the type attribute) is available. In some embodiments, the Location element 206 can specify a plurality of locations in a string that are each separated by a comma (',') and end with a semicolon (';'). In some embodiments, the string of the Location element 206 may include a white space (e.g., between two commas or between the last comma and the semicolon), to indicate an editing or Ad insertion opportunity for specifying a corresponding MPD location. If there is a space, in some embodiments each of MPD-internal identifiers (MPD@id) shall be provided since the inserted ad may have a different MPD@id. Including the MPD@id can, for example, help a DASH client differentiate the inserted ad from the original ongoing content.

In some embodiments, the UpdateProperty type can be used in conjunction with the MPD type. For example, in some embodiments for an UpdateProperty type of "patch," if the MPD type is "static," the Media Presentations available at the locations specified by the Location element 206 are organized as the ordered multiple patches to the Media Presentations. For example, in the order of the locations in the Location element 206, the assembled Media Presentations shall form a full Media Presentation for the content. In some embodiments, for an UpdateProperty type of "patch," if the MPD type is "dynamic," the Media Presentations available at the locations specified in the Location element 206 is a patch that is the update to the Media Presentations for a live service. In some embodiments, for an UpdateProperty type of "full," the Location element 206 may be used to provide extra locations for the available Media Presentations for both static and dynamic Media Presentations (e.g., the same as the MPD Location element MPD.Location).

The UpdateProperty element can also have a value attribute, e.g., @value. The value can be and/or specify various parameters such as, for example, a time of space, an indication of whether the content can be terminated early (e.g., an advertisement), a time to termination of the playback, and/or the like. For example, the time of space can be used when white space occurs in an MPD field, such as within the "UpdateProperty.Location field", as discussed herein. The time of space parameter can be a data field, such as a non-negative integer (e.g., in decimal) that provides the time in seconds of an opportunity for editing or performing ad insertion for white space that appears in the MPD field. As another example, the early termination parameter can be a data field, such as a Boolean, used to enable a DASH client to optionally terminate the playback of inserted content prior to the end of the inserted content. As a further example, the time to termination parameter can be used when content can be early terminated. The time to termination parameter can be a data field, such as an integer (e.g., a non-negative integer in decimal representation) used to specify the play time in seconds before the playback can be terminated. A value of zero can specify, for example, no playback, or that the content can be terminated at any time after beginning playback.

In some embodiments, a DASH MPD update property scheme can be provided to specify the scheme for the new MPD update property. The scheme to provide additional information for the MPD organization, update and location can be specified by a URN (e.g., "urn:mpeg:dash:mpd-update-property:2018"). The scheme can be used, for example, with Essential Property Descriptors together with an UpdateProperty element, with Supplemental Property Descriptors, and/or the like. The patch definition can leverage existing patch definitions, such as the patch definition specified in IETF RFC 5261, which is hereby incorporated by reference herein in its entirety. IETF RFC 5261 defines a valid XML patch that is compliant with the XML Patch Operations framework. The MPD with the scheme can serve as the root MPD, and can assemble with all patches to form a full Media Presentation. An example of the syntax in an MPD can be, for example, <xs:element name="UpdateProperty" type="UpdatePropertyType" minOccurs="0" maxOccurs="1"/>.

Figure 3:
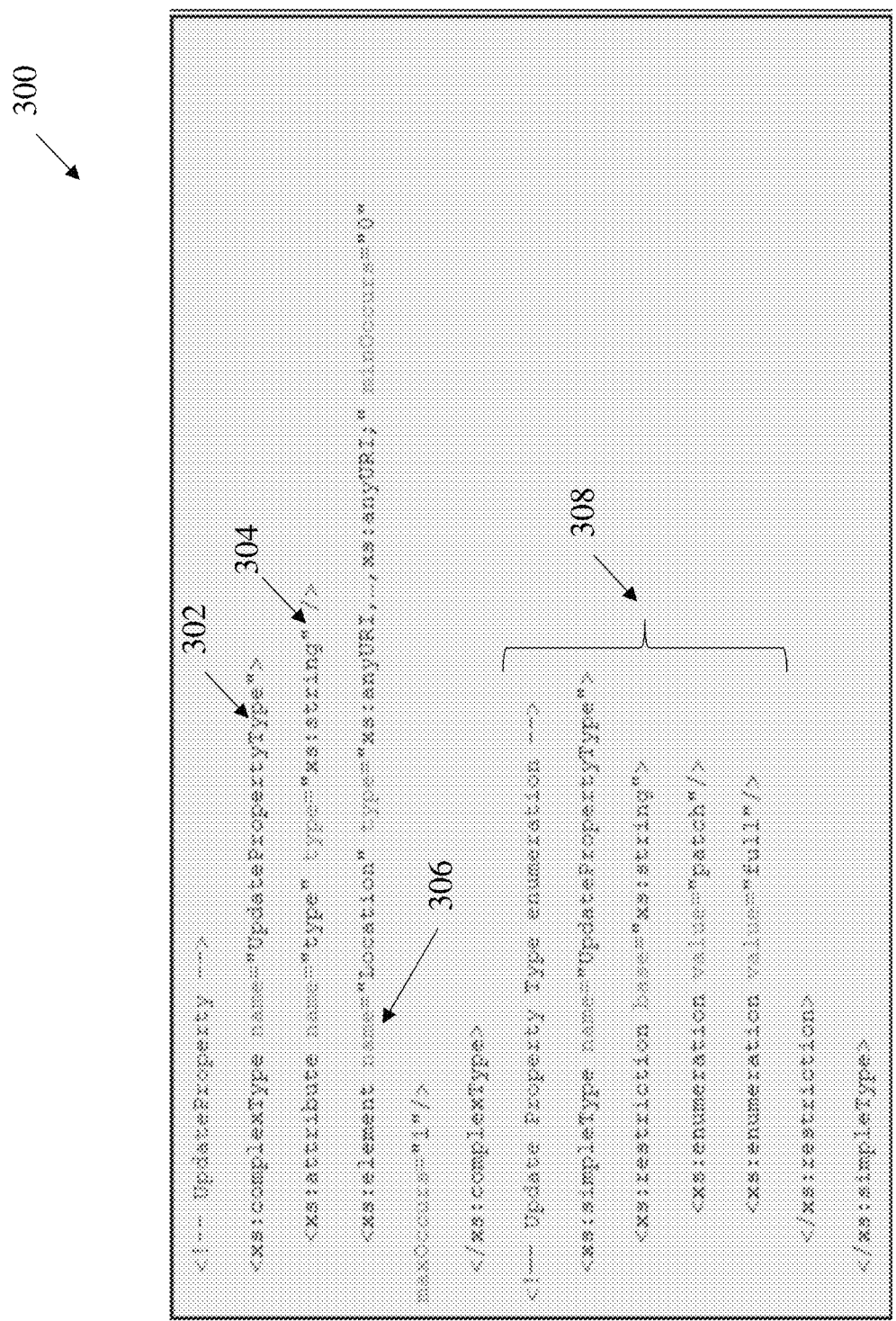
FIG. 3 shows an exemplary XML syntax of the Update Property Element, according to some embodiments.

FIG. 3 shows an exemplary XML syntax 300 of the UpdateProperty element 302, according to some embodiments. The XML syntax specifies that the UpdateProperty element 302 includes a type attribute 304 and a location element 306. The XML syntax also specifies a restriction 308 that the type of the type attribute 304 can include only the values of "patch" or "full." As described herein, given how the UpdateProperty can be specified, legacy DASH clients that do not understand the scheme can ignore the scheme and continue to use the MPD specified in the current standard. The DASH applications that support the scheme can offer additional properties, such as to support more features than otherwise available with legacy schemes, such as flexible content editing and ad insertion (e.g., pre-roll and mid-roll ad insertion).

FIG. 4 shows an example of an MPD using the scheme shown in FIG. 3 for an on-demand service, according to some embodiments. The MPD@type 402 is "static." The UpdateProperty 404 specifies a value 406 of "30,1,5," which means the UpdateProperty is adding content with a length of 30 seconds, the content can be early terminated (a boolean value of "1" indicates early termination is enabled), and the content can be early terminated after five seconds. The location 408 specifies the media presentations available, separated by commas and ending with a semicolon. The media presentation 410 specifies advertising content. Instead of including the media presentation 410, the example could instead include white space, so that the Ad servers, client applications, and/or the like can replace the white space with the desired ad content.

FIG. 5 shows an example of an MPD using the scheme in FIG. 3 for a live service, according to some embodiments. The MPD@type 502 is "dynamic." The UpdateProperty 504 specifies a value 506 of "60,1,0," which means the UpdateProperty is adding content with a length of 60 seconds, the content can be early terminated (a boolean value of "1" indicates early termination is enabled), and the content can be early terminated at any time (the value of "0"). The location 508 specifies the location of one media presentation 510, followed by a white space 512, so that the Ad servers, client applications, and/or the like can replace the white space 512 with the desired ad content when there is no MPD patch available.

In some embodiments, the techniques can specify an MPD organization (MPDO) descriptor. For example, a SupplementalProperty and/or an EssentialProperty element with a particular scheme can be referred to as an MPDO descriptor. For example, the scheme can be specified using the element's @schemeIdUri equal to "urn:mpeg:dash:mpd-org:2018." In some embodiments, the MPDO descriptor can be present at the MPD level, the Period level, and/or the like. The MPDO descriptor can indicate that MPD is organized such that the MPD comprises a "root" MPD and respective MPD patches, as well as one or more "leaf" MPDs. The MPDO descriptor can be used, for example, to signal additional MPD features that can be used generically, such as for supporting ad insertion for streaming services. For example, a DASH application can use the MPDO descriptor to offer additional MPD organization description with added content insertion or signaled ad insertion opportunities.

In some embodiments, the MPDO descriptor does not include the @value attribute. In some embodiments, the MPDO descriptor can include various elements and attributes, such as one or more of a type, a location, a time of space, early termination enable, time to early termination, and/or the like. For example, as discussed herein, the type can specify "patch" or "full." As another example, as discussed herein the location can specify a location at with the MPDs are available, and can vary depending on whether the MPD type is static or dynamic. As a further example, as discussed herein, the time of space can specify the seconds of the opportunity for editing or ad insertion; the early termination enable can indicate whether the inserted content can be terminated prior to ending; and the time to termination can specify the play time before the content can be terminated.

FIG. 6 shows an exemplary XML syntax 600 for an MPDO descriptor, according to some embodiments. The XML syntax 600 specifies a type attribute 602 and a location element 604. The XML syntax 600 also specifies three unsigned integer attributes time_of_space 606, early_termination_enable 608, and time_to_termination 610, discussed above. The XML syntax 600 also specifies a restriction 612 that the type of the type attribute 602 can include only the values of "patch" or "full." As described herein, given how the UpdateProperty can be specified, legacy DASH clients that do not understand the scheme can ignore the scheme and continue to use the MPD specified in the current standard. The DASH applications that support the scheme can offer additional properties, such as to support more features than otherwise available with legacy schemes, such as flexible content editing and ad insertion (e.g., pre-roll and mid-roll ad insertion).

An MPDO descriptor can be used for both live and on-demand services. The patch definition can leverage existing patch definitions, such as defined in IETF RFC 5261, which is a valid XML patch that is compliant with the XML Patch Operations framework. Some operations may only apply depending on whether the MPDO descriptor is being used for live or on demand content. For example, for on-demand services only the 'add' operation may apply to the patch processing.

In some embodiments, the MPDO descriptor can be used to provide a playlist. For example, starting with the root MPD, the MPDs (with @type) available at the MPDO location (MPDO:Location) can serve essentially as a playlist with the timeline in that provided order.

In some embodiments, for on-demand services an EssentialProperty can be used if the MPDO descriptor is present at MPD level in that the root MPD may be just the beginning part of the full MPD. Depending on the configuration, a legacy DASH client that does not understand the MPDO descriptor may fail to continue after the beginning part playback. A SupplementalProperty may be used if the MPDO descriptor is present at Period level in that the root MPD shall be a full MPD. A DASH client that understands such an MPDO descriptor may choose (e.g., after the first Period) to play back with the list specified in the MPDO descriptor and fill in any opportunities with client driven content/ad insertion. Depending on the configuration, a legacy DASH client may continue with the root MPD for the next Period.

FIG. 7 shows an example of an MPD 700 with an MPDO descriptor for an on-demand service, according to some embodiments. The MPD type (MPD@type) 702 is "static." The MPD 700 includes an EssentialProperty 704 with the scheme specified by "urn:mpeg:dash:mpd-org:2018," and is therefore an MDPO descriptor (referred to as MPDO descriptor 704, herein). The MPDO descriptor 704 type 706 is "patch." The MPDO descriptor 704 location element 708 includes white-space 710. As discussed herein, Ad servers, client applications, and/or the like may replace the white-space 710 with Ad content. The other attributes, namely time_of_space 712, early_termination_enable 714, and time_to_termination 716, specify the inserted Ad content may last 30 seconds, early termination is enabled, and that early termination can occur after 5 second playback, respectively.

Figure 8:
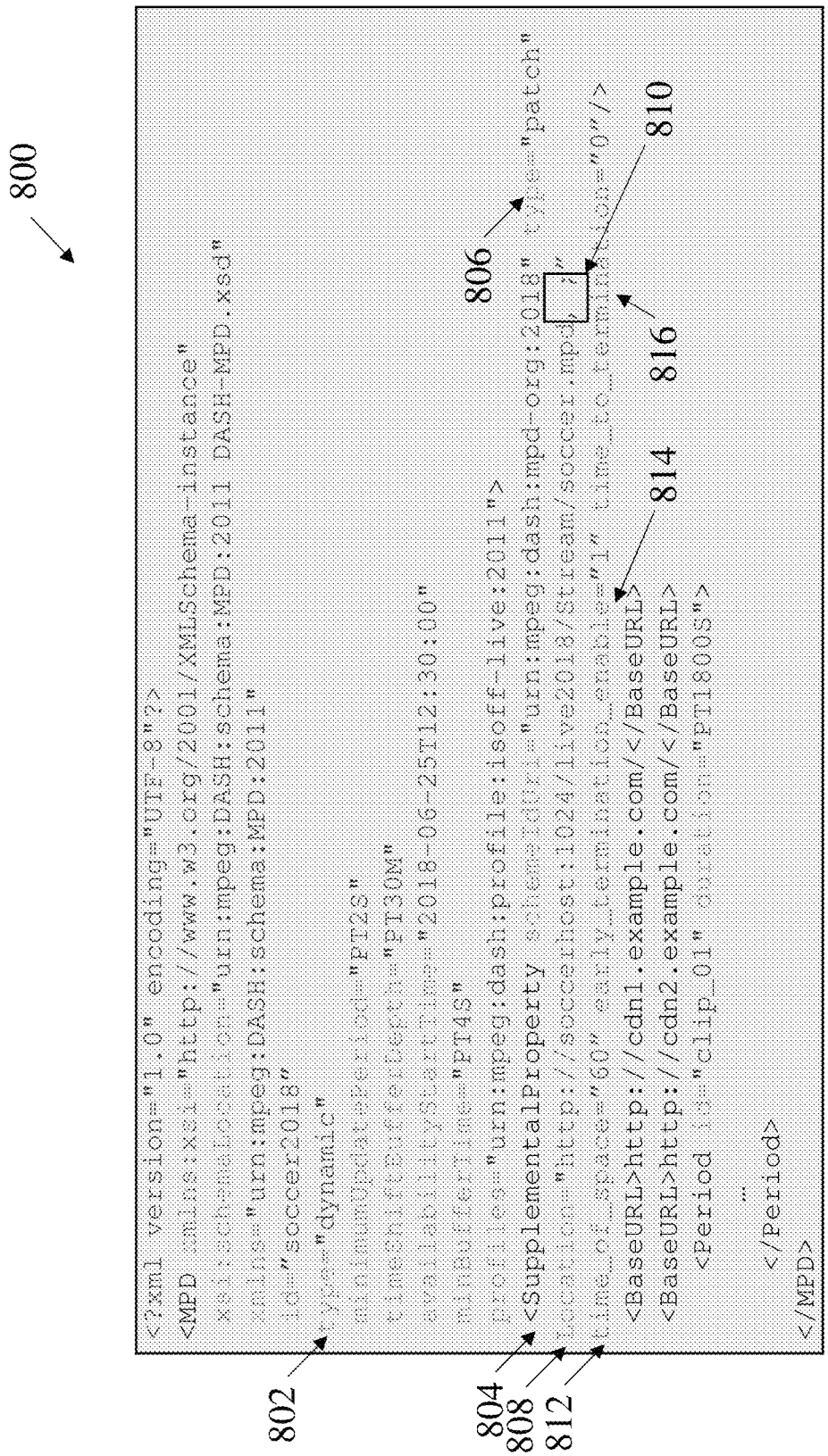
FIG. 8 shows an example of an MPD with an MPDO descriptor for a live service, according to some embodiments.

FIG. 8 shows an example of MPD 800 with an MPDO descriptor for a live service, according to some embodiments. The MPD type (MPD@type) 802 is "dynamic." The MPD 800 includes an EssentialProperty 804 with the scheme specified by "urn:mpeg:dash:mpd-org:2018," and is therefore an MDPO descriptor (referred to as MPDO descriptor 804, herein). The MPDO descriptor 804 type 806 is "patch." The MPDO descriptor 804 location element 88 includes white-space 810. As discussed herein, Ad servers, client applications, and/or the like may replace the white-space 810 with Ad content. The other attributes, namely time_of_space 812, early_termination_enable 814, and time_to_termination 816, specify the inserted Ad content may last 60 seconds, early termination is enabled, and early termination can occur at any time, respectively.

FIG. 9 shows an exemplary computerized method 900 for generating media presentation data, such as a media presentation description (MPD) file, according to some embodiments. At step 902, the encoding device (e.g., the HTTP DASH Server 102 in FIG. 1) determines video data that has been encoded in a plurality of different formats. As discussed herein, the media presentation data is associated with video data that has been encoded to support different bit rates. The encoding device can encode the video data into the plurality of bit rates and/or receive the encoded video data from another source.

At step 904, the encoding device generates the media presentation data. As discussed herein, the media presentation data can be an XML document that contains information about the media segments of the video data, their relationships and information necessary for a client (e.g., the HTTP DASH client 108 in FIG. 1) to choose among the segments, and other metadata that may be needed by the client. As discussed herein, the media presentation data can have a hierarchical structure, with a root element and various parts. For example, the MPD file has as its root an MPD element that can include various parts. While some of the examples discussed herein refer to MPD files, this is for exemplary purposes only and is not intended to be limiting.

At step 906, the encoding device generates, within the media presentation data, first data indicative of whether the media presentation data is for static video data or dynamic video data. At step 908, the encoding device generates, also within the media presentation data, second data indicative of at least one location reference (e.g., URL) to a location of a content update to the video data. As discussed herein, the first and second data can be included at the top level of the media presentation data and/or within sub-levels of the file, can be specified using different elements, and/or the like. For example, as discussed herein in some embodiments the media presentation data can be of a type that is a partial change (e.g., a patch) to previous media presentation data, and the second data can be specified using an essential property element or a supplemental property element. The essential or supplemental property element can include a set of location references, each of which provides a reference to a location with a content update (e.g., specified as a list of references that are separated by white spaces). As another example, as discussed herein in some embodiments the techniques can include generating an update property element of the media presentation data. The update property element can include the second data, which can include a set of location references, each of which provides a reference to a location with a content update. The update property element can also include other data, such as data indicative of whether the set of location references is associated with either (a) a partial change to previous media presentation data, or (b) full media presentation data. The second data can be a list of URLs separated by commas and terminated by a semicolon. The list of URLs can include white space to indicate an editing opportunity, such as an ad insertion opportunity. As a further example, as also discussed herein, in some embodiments the techniques can include generating an organization descriptor (e.g., an MPDO descriptor) using a supplemental property element or essential property element of the media presentation data that implements a specified scheme URI. The organization descriptor includes the second data, which can include a set of location references, each of which provides a reference to a location with a content update. The organization descriptor can include other data. For example, the organization descriptor can also include data indicative of whether the set of location references is associated with either (a) a partial change to previous media presentation data, or (b) full media presentation data. As another example, the organization descriptor can include data indicative of the time of an editing opportunity (e.g., in seconds), whether early termination of the content for the editing opportunity is supported, and/or a play time of the content required before being early terminated (if supported).

A decoding device and/or client (e.g., the HTTP Dash Client 108 in FIG. 1) can be configured to decode and/or play the media content using the media presentation data techniques of the present application. As discussed herein, for example, a DASH application usually has a corresponding MPD file. The MPD provides information for the DASH client to facilitate adaptive streaming of the content by downloading the media segments from the HTTP DASH server. The client can be configured to process MPD updates using the techniques described herein. For example, the client can be configured to process a media presentation data update that is specified as a partial change (e.g., a patch) to previous media presentation data, and which is specified using an essential property element (e.g., which includes a set of location references, URLs, etc.) or a supplemental property element. As another example, as discussed herein in some embodiments the client can be configured to process a media presentation data update that is specified using an update property element of the media presentation data. As a further example, as discussed herein, in some embodiments the client can be configured to process a media presentation data update by processing an organization descriptor (e.g., an MPDO descriptor), which is specified using a supplemental property element or essential property element of the media presentation data that implements a specified scheme URI.

Techniques operating according to the principles described herein may be implemented in any suitable manner. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Further, some techniques described above comprise acts of storing information (e.g., data and/or instructions) in certain ways for use by these techniques. In some implementations of these techniques—such as implementations where the techniques are implemented as computer-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as computer-executable instructions, these instructions may be executed on one or more suitable computing device(s) operating in any suitable computer system, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

A computing device may comprise at least one processor, a network adapter, and computer-readable storage media. A computing device may be, for example, a desktop or laptop personal computer, a personal digital assistant (PDA), a smart mobile phone, a server, or any other suitable computing device. A network adapter may be any suitable hardware and/or software to enable the computing device to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media may be adapted to store data to be processed and/or instructions to be executed by processor. The processor enables processing of data and execution of instructions. The data and instructions may be stored on the computer-readable storage media.

A computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A method for generating media presentation data associated with video data, the method comprising:
   generating media presentation data associated with video data encoded in a plurality of formats, each format associated with a different bit rate, comprising:
   generating, within the media presentation data, first data for a first field indicative of whether the media presentation data is for static video data or dynamic video data, wherein the first field can be set to a first value to indicate static video data and a second value to indicate dynamic video data; and
   generating, within the media presentation data, second data indicative of at least one location reference to a location of a content update to the video data, such that the media presentation data can specify the second data for both static video data or dynamic video data.

2. The method of claim 1, wherein the media presentation data comprises a media presentation description (MPD) file, and the MPD file comprises the first data and the second data.

3. The method of claim 1, wherein:
   the media presentation data is a partial change to previous media presentation data; and
   generating the second data comprises:
   generating an essential property element or a supplemental property element of the media presentation data comprising the second data; and
   generating the second data comprises generating a set of location references, wherein each location reference from the set of location references is to an associated location with an associated content update.

4. The method of claim 3, wherein generating the set of location references comprises generating a list of uniform resource locators separated by white spaces.

5. The method of claim 1, wherein generating the second data comprises generating an update property element of the media presentation data, the update property element comprising:
   the second data, wherein generating the second data comprises generating a set of location references, wherein each location reference from the set of location references is to an associated location with an associated content update; and
   third data indicative of whether the set of location references is associated with either (a) a partial change to previous media presentation data, or (b) full media presentation data.

6. The method of claim 5, wherein generating the set of location references comprises generating a list of uniform resource locators separated by commas and terminated by a semicolon.

7. The method of claim 6, wherein generating the list of uniform resource locators comprises including a white space indicative of an editing opportunity.

8. The method of claim 1, wherein generating the second data comprises generating an organization descriptor using a supplemental property element or essential property element of the media presentation data, the organization descriptor comprising:
   the second data, wherein generating the second data comprises generating a set of location references, wherein each location reference from the set of location references is to an associated location with an associated content update; and
   third data indicative of whether the set of location references is associated with either (a) a partial change to previous media presentation data, or (b) full media presentation data.

9. The method of claim 8, wherein generating the organization descriptor comprises generating third data of the organization descriptor, wherein the third data comprises data indicative of one or more of a time of an editing opportunity, whether early termination of content for the editing opportunity is supported, and a play time of the content required before being early terminated.

10. An apparatus configured to generate media presentation data associated with video data, the apparatus comprising a processor in communication with memory, the processor being configured to execute instructions stored in the memory that cause the processor to:
   generate media presentation data associated with video data encoded in a plurality of formats, each format associated with a different bit rate, comprising:
   generating, within the media presentation data, first data for a first field indicative of whether the media presentation data is for static video data or dynamic video data wherein the first field can be set to a first value to indicate static video data and a second value to indicate dynamic video data; and
   generating, within the media presentation data, second data indicative of at least one location reference to a location of a content update to the video data, such that the media presentation data can specify the second data for both static video data or dynamic video data.

11. The apparatus of claim 10, wherein the media presentation data comprises a media presentation description (MPD) file, and the MPD file comprises the first data and the second data.

12. The apparatus of claim 10, wherein:
the media presentation data is a partial change to previous media presentation data; and
generating the second data comprises:
generating an essential property element or a supplemental property element of the media presentation data comprising the second data; and
generating the second data comprises generating a set of location references, wherein each location reference from the set of location references is to an associated location with an associated content update.

13. The apparatus of claim 12, wherein generating the set of location references comprises generating a list of uniform resource locators separated by white spaces.

14. The apparatus of claim 10, wherein generating the second data comprises generating an update property element of the media presentation data, the update property element comprising:
the second data, wherein generating the second data comprises generating a set of location references, wherein each location reference from the set of location references is to an associated location with an associated content update; and
third data indicative of whether the set of location references is associated with either (a) a partial change to previous media presentation data, or (b) full media presentation data.

15. The apparatus of claim 14, wherein generating the set of location references comprises generating a list of uniform resource locators separated by commas and terminated by a semicolon.

16. The apparatus of claim 15, wherein generating the list of uniform resource locators comprises including a white space indicative of an editing opportunity.

17. The apparatus of claim 10, wherein generating the second data comprises generating an organization descriptor using a supplemental property element or essential property element of the media presentation data, the organization descriptor comprising:
the second data, wherein generating the second data comprises generating a set of location references, wherein each location reference from the set of location references is to an associated location with an associated content update; and
third data indicative of whether the set of location references is associated with either (a) a partial change to previous media presentation data, or (b) full media presentation data.

18. The apparatus of claim 17, wherein generating the organization descriptor comprises generating third data of the organization descriptor, wherein the third data comprises data indicative of one or more of a time of an editing opportunity, whether early termination of content for the editing opportunity is supported, and a play time of the content required before being early terminated.

19. A method for processing media presentation data associated with video data, the method comprising:
receiving media presentation data associated with video data encoded in a plurality of formats, each format associated with a different bit rate;
determining, from the media presentation data, first data for a first field indicative of whether the media presentation data is for static video data or dynamic video data, wherein the first field can be set to a first value to indicate static video data and a second value to indicate dynamic video data such that the media presentation data can specify second data for both static video data or dynamic video data;
determining, from the media presentation data, the second data, wherein the second data is indicative of at least one location reference to a location of a content update to the video data; and
downloading a media segment of the video data based on the first data and the second data.

20. An apparatus configured to process media presentation data associated with video data, the apparatus comprising a processor in communication with memory, the processor being configured to execute instructions stored in the memory that cause the processor to:
receive media presentation data associated with video data encoded in a plurality of formats, each format associated with a different bit rate;
determine, from the media presentation data, first data for a first field indicative of whether the media presentation data is for static video data or dynamic video data, wherein the first field can be set to a first value to indicate static video data and a second value to indicate dynamic video data such that the media presentation data can specify second data for both static video data or dynamic video data;
determine, from the media presentation data, the second data, wherein the second data is indicative of at least one location reference to a location of a content update to the video data; and
download a media segment of the video data based on the first data and the second data.

* * * * *